Nov. 24, 1936.   H. S. JOHNS   2,061,838
CONVEYING AND DRIVING BELT
Filed Feb. 23, 1935   2 Sheets-Sheet 1
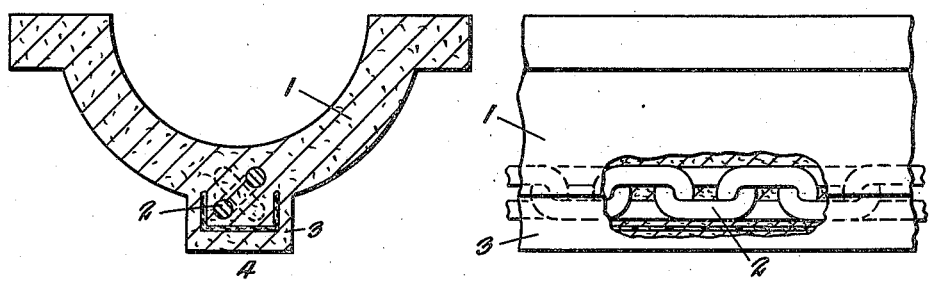
Fig. 1.   Fig. 2.
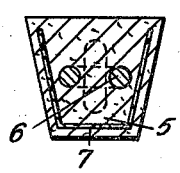 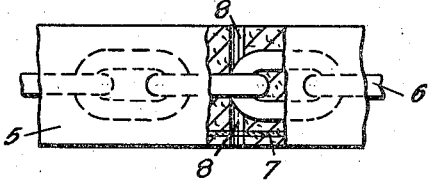 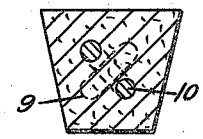
Fig. 3.   Fig. 4.   Fig. 5.
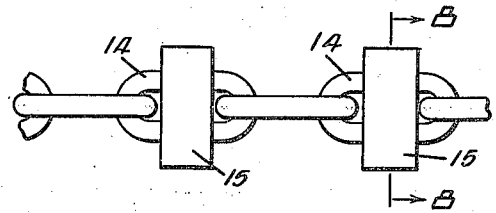 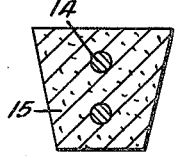 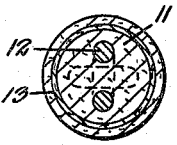
Fig. 7.   Fig. 8.   Fig. 6.
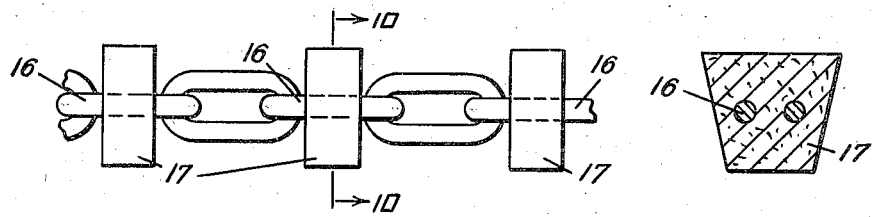 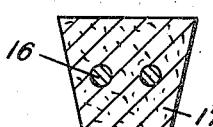
Fig. 9.   Fig. 10.
— Inventor —
Henry S. Johns
by Charles W. Church
att.

Nov. 24, 1936.　　　H. S. JOHNS　　　2,061,838
CONVEYING AND DRIVING BELT
Filed Feb. 23, 1935　　　2 Sheets-Sheet 2
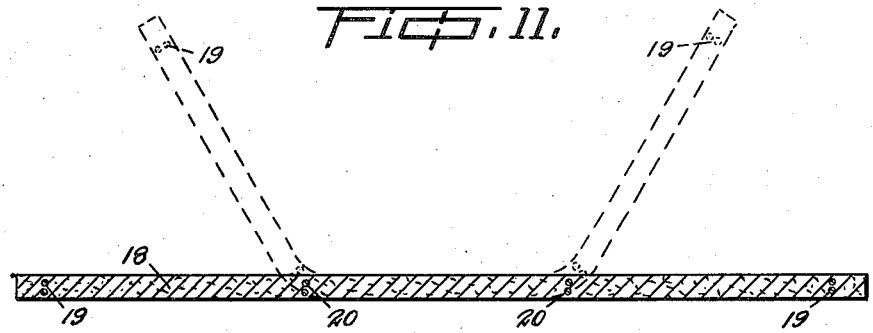
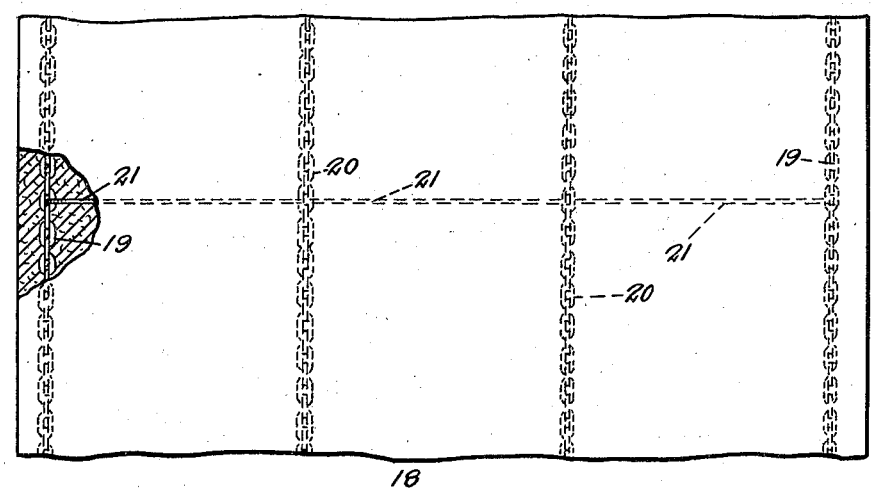
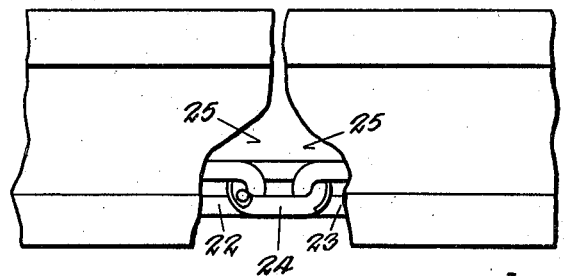
Inventor—
Henry S. Johns Patented Nov. 24, 1936

2,061,838

UNITED STATES PATENT OFFICE 2,061,838

CONVEYING AND DRIVING BELT

Henry Stinson Johns, North Grimsby Township, Ontario, Canada

Application February 23, 1935, Serial No. 7,676

6 Claims. (Cl. 198—202)

My invention relates to improvements in conveying and driving belts formed of rubber or the like, and the object of my invention is to provide a belt formed of a combination of rubber and metal chain and wherein the chain is preferably embedded within the belt and takes the place of the cords or fabric as now used, it being understood that cords or fabric are primarily provided to retain the belting against stretch.

My invention has been particularly developed for application to my conveyor belt as shown in my United States Patent No. 2,013,242, September 3, 1935.

My present invention also provides for the insertion of chain within driving belts and flat or troughed conveying belts of the conventional type.

A further object of my invention is to provide a driving belt wherein only certain of the chain links are embedded in rubber and the intervening links exposed.

My invention consists of the provision of belts reinforced by chain all as hereinafter more particularly described and illustrated in the accompanying drawings in which:—

Figure 1 is a cross sectional view through a conveying belt as described in my Patent No. 2,013,242.

Figure 2 is a side elevational view of a portion of the belt illustrated in Figure 1, a part of such portion being broken away to disclose the chain therein.

Figure 3 is a cross sectional view through a V driving belt showing a chain embedded therein, the chain being so positioned that the alternate links are parallel in respect to the top and bottom faces of the belt.

Figure 4 is a plan view of a portion of the belt illustrated in Figure 3, part of such portion being broken away.

Figure 5 is a similar view to Figure 3 showing the chain so positioned that its links are angularly inclined in respect to the top and bottom faces of the belt.

Figure 6 is a cross sectional view through a round belt showing a chain embedded therein.

Figure 7 is a side elevational view of a length of chain showing rubber blocks encircling the vertically positioned links.

Figure 8 is a vertical cross sectional view taken through the line 8—8, Figure 7.

Figure 9 is a similar view to Figure 7 showing a chain with the horizontal links encircled in rubber blocks.

Figure 10 is a vertical cross sectional view taken through the line 10—10, Figure 9.

Figure 11 is a cross sectional view through a flat conveying belt showing a plurality of spaced apart lengths of chain embedded therein, the side portions of the belt being shown bent upwardly in dotted lines whereby a trough belt is constituted.

Figure 12 is a plan view of a portion of the belt illustrated in Figure 11, and

Figure 13 is a side elevational view of the two ends of a belt such as shown in Figure 2, showing the joint or "monkey" link connecting the ends of the embedded chain.

Like characters of reference indicate corresponding parts in the different views in the drawings.

In standard practice rubber driving and conveying belts are formed with cores of fabric or cord which are intended to retain the belts against stretch, and while they, to a certain extent, fulfill this function, it is known by those conversant with the art that cord or fabric cord belts do stretch, and in fact have to be shortened from time to time. It is difficult for the manufacturer to guarantee either the non-stretchable qualities or tensile strengh of a fabric or cord rubber-coated belt.

In my invention I substitute chain for the cord or fabric, the chain being embedded within rubber. The rubber can be vulcanized to the metal or merely molded therearound. The chain links are proportionately dimensioned to the diameters of the pulleys over which the chain is carried, so that there is very little relative movement between joined links in passing over a curved surface. For example, when a belt is designed to pass over pulleys of 12 inch diameter, chains of a link length of an inch may be used. As chain can be load tested and will not stretch under its specified load, it will be seen that the manufacturer will be able to guarantee the non-stretchability and tensile strength of a chain cored belt.

In Figures 1 and 2, I show one of my semi-circular rubber conveying belts 1 as described in my United States Patent No. 2,013,242, September 3, 1935, and in this belt as illustrated I embed a chain 2 in the lower rib 3 in place of the cord or fabric which I have heretofore used. It will be seen that the links of the chain are shown angularly placed in respect to the bottom face of the rib, although I do not limit myself to this position. In certain cases a layer of cords or fabric 4 may be interposed between the chain and the face of the rib in order to toughen the rubber at this spot against wear.

In Figures 3 and 4, I show a V belt 5 having a chain 6 embedded therein, alternate links being parallel to the upper and lower faces of the belt, and strips of fabric or cords 7 embedded within the belt adjacent to the inclined sides thereof.

I have ascertained through numerous flexing and driving tests that any kind of a rubber belt having the proper sized chain therein instead of cords or fabric is more flexible than a rubber-covered fabric or cord belt, and, as there is little movement between the interconnected links in passing over pulleys, little or no frictional heat has been detected generating within the belt. If, however, in certain installations there is any question of the generation of frictional heat, where for example the belts are running at a high speed, the heat can be dissipated by the provision of orifices running from the outside of the belt to the link joints as shown in the belt illustrated in Figure 4 wherein cooling orifices 8 are shown.

In Figure 5 the V belt 9 is shown with the links of its contained chain 10 angularly positioned in respect to the upper and lower faces of the belt.

In Figure 6, I show a round belt 11 having a chain 12 centrally positioned therein and surrounded by cords or fabric 13.

In Figures 7 and 8, I show a length of chain wherein each alternate vertical link 14 is embedded intermediately of its length within a rubber block 15 whereby a driving belt is constituted. The blocks 15 can be of similar cross sectional shape to that of a V belt or of any other shape desired.

In Figures 9 and 10, I also show a chain having alternate links embedded in rubber blocks, but in this case the alternate horizontal links 16 are embedded intermediately of their length in rubber blocks 17. In the construction shown in Figures 7 and 9 the inter-engaging portions of the links are not embedded in rubber. It will be also appreciated that a driving belt can be formed wherein a rubber block is carried on each link, or in other words, a combination of the forms shown in Figures 7 and 9.

In Figures 11 and 12, I show a flat rubber belt 18 having a plurality of spaced apart lengths of chain embedded therein, two of the chains 19 being positioned in the vicinity of the edge portions of the belts and the other chains 20 positioned intermediately of the width of the belt. The chains can be contained within the belt absolutely independently of one another or be connected by cross links or bars 21 which may be positioned in alignment across the belt, or in staggered relationship. This type of belt is adaptable for use as a trough belt as illustrated by the dotted lines in Figure 11 in that it combines both flexibility and strength.

In joining the ends of my chain contained belting, I cut the rubber away to expose the chain ends 22 and 23 as illustrated in Figure 13, and join the links with a joint or "monkey" link 24. I then fill in the cut away rubber ends 25 with raw rubber and mold and vulcanize it into an integral part of the belt surrounding the joined ends of the chain.

From the above description it will be seen that I have provided a very simple and positive means for retaining a rubber belt against stretch without interfering with the flexibility of the belt or increasing its manufacturing cost, and, while I have shown several embodiments of my invention, it is to be understood that it is susceptible to various changes and alterations without departing from the spirit thereof as set forth in the appended claims.

What I claim as my invention is:

1. A belt having a substantially flat bottom face and formed of a material having the elastic characteristics of rubber, and a link chain having the standard type substantially oval links embedded in the belt to retain it against stretch, the links being obliquely positioned in transverse relation to the bottom face of the belt.

2. A belt molded in trough shape, an exterior longitudinal rib having a substantially flat bottom face and protruding from the bottom of the belt, the belt being formed of a material having the elastic characteristics of rubber, and a link chain having the standard type substantially oval links embedded in the rib and in the belt to form a perforated bond between the belt and the rib and to retain the belt against stretch, the links being obliquely positioned in transverse relation to the bottom face of the rib, whereby a portion of the elastic material extends transversely of the belt and rib from the flat bottom face of the rib through each link.

3. A belt having one face substantially flat and formed of a material having the elastic characteristics of rubber, and a link chain having the standard type substantially oval links embedded in the belt to retain it against stretch, the links being obliquely positioned in transverse relation to the flat face of the belt.

4. A belt having one face substantially flat and formed of a material having the elastic characteristics of rubber, and a link chain having the standard type substantially oval links embedded in the belt to retain it against stretch, the links being each obliquely positioned in transverse relation to the bottom of the belt whereby a portion of the elastic material extends transversely of the belt from the flat face thereof through each link.

5. A belt formed of a material having the elastic characteristics of rubber and molded in trough shape, and a link chain having the standard type substantially oval links embedded in the belt to retain it against stretch, the links being obliquely positioned in transverse relation to the plane extending across the upper edges of the belt.

6. A belt formed of a material having the elastic characteristics of rubber and molded in trough shape, and an exterior longitudinal rib protruding from the bottom of the belt and formed integrally therewith, and a link chain having the standard type substantially oval links embedded in the rib to retain the belt against stretch, the links being obliquely positioned in transverse relation to the plane extending across the upper edges of the belt.

HENRY STINSON JOHNS.